United States Patent [19]

Ishimaru et al.

[11] Patent Number: 4,952,348

[45] Date of Patent: Aug. 28, 1990

[54] PROCESS FOR PREPARING SHAPED ARTICLE HAVING THICK SECTION

[75] Inventors: Yoshiharu Ishimaru, Tokyo; Motoyuki Yamato, Kanagawa; Koji Chono, Okayama, all of Japan

[73] Assignee: Nippon Zeon Co., Ltd., Tokyo, Japan

[21] Appl. No.: 242,842

[22] Filed: Sep. 12, 1988

[30] Foreign Application Priority Data

Sep. 18, 1987 [JP] Japan ................................ 62-232542
Jul. 29, 1988 [JP] Japan ................................ 63-188162

[51] Int. Cl.$^5$ ...................... B29C 45/78; C08F 32/00
[52] U.S. Cl. .................... 264/40.6; 264/237; 264/328.2; 264/328.6; 264/328.16; 264/326.17; 264/328.18; 264/331.12; 264/331.13; 264/331.15; 264/331.17; 525/290; 526/283
[58] Field of Search ............ 264/40.6, 237, 328.2, 264/328.6, 328.16, 328.17, 328.18, 331.12, 331.13, 331.15, 331.17, 348; 525/290; 526/283

[56] References Cited

U.S. PATENT DOCUMENTS

| | | | |
|---|---|---|---|
| 4,053,548 | 10/1977 | Lundberg et al. | 264/237 X |
| 4,380,617 | 4/1983 | Minchak et al. | 526/283 X |
| 4,426,502 | 1/1984 | Minchak | 526/172 |
| 4,440,340 | 8/1983 | Klosiewicz | 264/328.6 |
| 4,481,344 | 11/1984 | Newburg | 526/283 |
| 4,507,453 | 3/1985 | Tom | 526/283 |
| 4,598,102 | 7/1986 | Leach | 264/328.2 X |
| 4,657,981 | 4/1987 | Klosiewicz | 525/211 |
| 4,661,575 | 4/1987 | Tom | 526/283 |
| 4,708,969 | 11/1987 | Leach | 264/328.2 X |
| 4,748,216 | 5/1988 | Tom | 526/283 X |

FOREIGN PATENT DOCUMENTS

| | | |
|---|---|---|
| 1162350 | 2/1984 | Canada . |
| 139170 | 5/1985 | European Pat. Off. . |
| 142861 | 5/1985 | European Pat. Off. . |
| 57-83522 | 5/1982 | Japan . |
| 58-127728 | 7/1983 | Japan . |
| 58-129013 | 8/1983 | Japan . |
| 59-51911 | 3/1984 | Japan . |
| 60-79035 | 5/1985 | Japan . |
| 60-186511 | 9/1985 | Japan . |
| 61-120814 | 6/1986 | Japan . |

*Primary Examiner*—Jeffery Thurlow
*Assistant Examiner*—Leo B. Tentoni
*Attorney, Agent, or Firm*—George A. Kap; Nestor W. Shust

[57] ABSTRACT

Process for preparing a pore-free polynorbornene product by bulk polymerizing a monomer charge containing at least one norbornene monomer having tricyclic or higher cyclic structure with a metathesis catalyst by controlling maximum exotherm temperature to a level of 160° C. or below or by controlling the temperature difference to 80° C. or below between the inner and exterior temperatures during the cooling period of said product from the maximum exotherm to the glass transition temperature of said product.

9 Claims, No Drawings

PROCESS FOR PREPARING SHAPED ARTICLE HAVING THICK SECTION

BACKGROUND OF THE INVENTION (1) Field of the Invention

The present invention relates to a process for preparing a novel shaped article having a thick section composed of a polycyclic norbornene polymer. More particularly, the present invention relates to a process for preparing a shaped article of a thick section having no pores or voids in the interior, high mechanical strengths and a reduced water-absorbing property.

(2) Description of the Related Art

The technique of forming a processing stock such as a rod, a plate, a tube or a sheet from engineering plastics such as a polyimide resin, an aromatic polyamide resin, a polyacetal resin, super-high-molecular-weight polyethylene, polybutylene terephthalate or a polycarbonate resin, and subjecting the stock to machining such as cutting as in the case of a metal stock, is known.

The machining of plastic stock is superior to an injection molding thereof in various points. For example, a part of a small lot can be obtained at a lower cost, a part having a high precision can be obtained, and a part having a shape which is difficult to form by injection molding, can be easily prepared. Moreover, standard tools used for the machining of metals can be used for the machining of plastic stock.

Nevertheless, although conventional engineering plastics have excellent heat resistance, mechanical strength and the like, since machining stock is prepared by injection molding, the formation of a large part is difficult and the cost of a mold is high, and therefore, the molding process is limited. A so-called cast nylon product is a molded nylon article obtained by directly casting monomers in a mold and carrying out polymerization and molding in the mold, and according to this method, a larger product can be prepared, compared with injection molding or extrusion molding, but the product has a problem in that the water-absorbing property is high and the dimensional stability is poor.

Recently, technical developments have been made in the field of reactive injection molding (sometimes referred to as "RIM" hereinafter) using polycyclic norbornene monomers represented by dicyclopentadiene. A molded product obtained according to this method has a good heat resistance and water-absorbing property, but these molded products are generally thin and have a thickness smaller than 10 mm, and thick products such as machinable stock cannot be obtained. Furthermore, where a processing stock is prepared according to the RIM method, pores or voids having a size of 1 mm or more, or a size of 5 mm in an extreme case, which are called cavities, are often formed in the interior, and the stock is not suitable for machining.

SUMMARY OF THE INVENTION

The present inventors carried out research with a view to developing a cheap machinable stock having a reduced water-absorbing property, good dimensional stability, good heat resistance, and light weight, and as a result, found that, if ring-opening bulk polymerization of a polycyclic norbornene monomer is carried out under conditions such that the maximum exotherm temperature does not exceed 160° C., or if the temperature difference in the interior of the polymerization product is controlled below 80° C. during the course of cooling the polymerization product from the maximum exotherm temperature to at least the glass transition temperature, a shaped article of a thick section having excellent characteristics as mentioned above and substantially free of pores, even in the case of a large article, can be obtained, and the present invention was completed based on this finding. By the term "maximum exotherm temperature" used herein, we mean the maximum recorded temperature reached by the polymerization mixture in the mold.

In one aspect of the present invention, there is provided a process for the preparation of a substantially pore-free shaped article having a thick section, composed of polycyclic norbornene polymer, which comprises bulk-polymerizing a norbornene monomer having a tricyclic or higher cyclic structure in the presence of a methathesis catalyst in a mold while controlling the maximum curing exotherm temperature of the reaction mixture to a level not exceeding 160° C.

In another aspect of the present invention, there is provided a process for the preparation of a substantially pore-free shaped article having a thick section, composed of polycyclic norbornene polymer, which comprises bulk-polymerizing a norbornene monomer having a tricyclic or higher cyclic structure in the presence of a methathesis catalyst in a mold, and cooling the polymerization product while controlling the temperature difference in the interior of the polymerization product below 80° C. during the cooling period spanning from the maximum curing exotherm temperature to the glass transition temperature.

DETAILED DESCRIPTION OF THE INVENTION

In the bulk polymerization of a norbornene monomer by the RIM method, the reaction is generally advanced in a relatively short time in a mold maintained at a high temperature of about 90 to about 130° C. Therefore, when a large molded article is prepared, the temperature of the reaction mixture becomes too high due to the abrupt rise of temperature and volatilization of dicyclopentadiene or the unreacted product occurs, or a great temperature difference and thus a great shrinkage difference arises between the interior of the product and the surface thereof in contact with the mold due to the abrupt cooling of the product, with the result that cavities, i.e., fine pores, are formed in the interior of the molded article.

In one aspect of the present invention, by removing the reaction heat from the mold and controlling the rate of reaction, namely, controlling the maximum curing exotherm temperature to a level not exceeding 160° C., preferably not exceeding 150° C., an excellent thick molded article free of pores, and composed of a norbornene polymer, can be obtained by the RIM method.

In another aspect of the present invention, even where the maximum curing exotherm temperature cannot be controlled to a level not exceeding 160° C., an excellent thick molded article free of pores, and composed of a norbornene polymer, can be obtained by the RIM method by controlling the temperature difference in the interior of the polymerization product below 80° C., preferably within 70° C., more preferably within 50° C. at least during the cooling course from the maximum curing exotherm temperature to the glass transition temperature in the step of removing the reaction heat from the mold.

The essential elements of the present invention will now be described in detail.

(Norbornene monomer)

The monomer used as the starting material of the thick shaped article in the present invention is a polycyclic norbornene monomer having a tricyclic or higher cyclic structure. Since the norbornene monomer having a tricyclic or higher cyclic structure is used, a polymer having a high heat distortion temperature is obtained, and a high heat resistance required for a machinable stock can be attained.

In the present invention, preferably the formed polymer is of the thermosetting type. For this purpose, a crosslinking monomer is used in an amount of at least 10% by weight, preferably at least 30% by weight, based on the total monomers. In the case of a thermosetting type polymer, a fusion by friction heat at the machining step can be prevented, and the machinability can be remarkably improved.

As the norbornene monomer having a tricyclic or higher cyclic norbornene monomer, there can be mentioned tricyclic monomers such as dicyclopentadiene and dihydrodicyclopentadiene, tetracyclic monomers such as tetracyclododecene, pentacyclic monomers such as tricyclopentadiene, and heptacyclic monomers such as tetracyclopentadiene. Alkyl, alkylidene and aryl substitution products of these monomers can be used, which include, for example, methyl-, ethyl-, propyl- or butyl-substitution product, an ethylidene-substituted product, and a phenyl- or tolyl-substituted product.

The crosslinking monomer is a polycyclic norbornene monomer having at least two reactive double bonds. For example, there can be mentioned dicyclopentadiene, tricyclopentadiene and tetracyclopentadiene. The crosslinking monomer may be the same as the norbornene monomer.

These norbornene monomers can be used singly or in the form of a mixture of two or more thereof.

The norbornene monomer having a tricyclic or higher cyclic monomer can be obtained by heat-treating a dicyclopentadiene. As the heat treatment method, there can be mentioned a method in which a dicyclopentadiene is heated at a temperature of 120 to 250° C. in an inert gas atmosphere for 0.5 to 20 hours, whereby a monomer mixture comprising pentacyclopentadecadiene and the unreacted dicyclopentadiene is obtained.

In the present invention, a bicyclic norbornene monomer that can be ring-opening-polymerized, such as 2-norbornene, 5-methyl-2-norbornene, 5-ethylidene-2-norbornene or 5-phenyl-2-norbornene, or a monocyclic cyclo-olefin such as cyclobutene, cyclopentene, cyclopentadiene, cyclo-octene or cyclododecene can be used together with at least one of the above-mentioned norbornene monomers having a tricyclic or higher cyclic structure, as long as the attainment of the object of the present invention is not prevented.

(Methathesis catalyst system)

In the present invention, any known methathesis catalyst (see, for example, Japanese Unexamined Patent Publications No. 58-127,728, No. 58-129,013, No. 59-51,911, No. 60-79,035, No. 60-186,511) can be used without limitation for the bulk polymerization of the norbornene monomer.

As the methathesis catalyst, there can be mentioned halides, oxyhalides, oxides, and organic ammonium salts of tungsten, molybdenum and tantalum. As preferred examples, there can be mentioned tungsten compounds such as tungsten hexachloride, tungsten oxytetrachloride, tungsten oxide, tridodecylammonium tungstate, methyltricaprylammonium tungstate, tri(tridecyl)ammonium tungstate, and trioctylammonium tungstate; molybdenum compounds such as molybdenum pentachloride, molybdenum oxytrichloride, tridodecylammonium molybdate, methyltricaprylammonium molybdate, tri(tridecyl)ammonium molybdate, and trioctylammonium molybdate; and tantalum compounds such as tantalum pentachloride. Use of a catalyst soluble in the norbornene monomer used for the reaction is preferred, and from this viewpoint, the use of an organic ammonium salt is recommended. Where the catalyst is a halide, the catalyst can be solubilized by pretreating the catalyst with an alcohol or phenol compound. If necessary, a Lewis base such as benzonitrile or tetrahydrofuran or a chelating agent such as acetylacetone or an alkyl acetoacetate can be used in combination with the catalyst, to prevent a premature polymerization.

Alkylaluminum halides, alkoxyalkylaluminum halides, aryloxyalkylaluminum halides and organic tin compounds can be used as the activator (co-catalyst). As preferred examples, there can be mentioned ethylaluminum dichloride, diethylaluminum monochloride, ethylaluminum sesquichloride, diethylaluminum iodide, ethylaluminum diiodide, propylaluminum dichloride, propylaluminum diiodide, isobutylaluminum dichloride, ethylaluminum dibromide, methylaluminum sesquichloride, methylaluminum sesquibromide, tetrabutyltin, and precondensates of alkylaluminum halides with alcohols.

Among these activators, alkoxyalkylaluminum halides and aryloxyalkylaluminum halides are advantageous in operation because these organoaluminum halides exhibit an appropriate pot life at room temperature even when the activator is mixed with the catalyst component (see, for example, Japanese Unexamined Patent Publication No. 59-51,911). An alkylaluminum halide involves a problem in that polymerization is instantaneously started when it is mixed with the catalyst, but the start of the polymerization can be delayed by using a polymerization controller such as an ether, an ester, a ketone, a nitrile or an alcohol in combination with the activator (see, for example, Japanese Unexamined Patent Publications No. 58-129,013 and No. 61-120,814). If such a controller is not used, the apparatus and operation must be controlled so that a catalyst system having a short pot life can be used. In the case of a catalyst system having a short pot life, however, the reaction is promptly advanced and it is difficult to remove the reaction heat efficiently. Accordingly, preferably a catalyst system having a pot life of longer than 5 minutes, especially longer than 10 minutes, particularly especially longer than 30 minutes, at 25° C., is used.

A halogenated hydrocarbon such as chloroform, tetrachlorocarbon or hexachlorocyclopentadiene can be used in combination with the catalyst and activator (see, for example, Japanese Unexamined Patent Publication No. 60-79,035). Moreover, a halide such as tin tetrachloride, silicon tetrachloride, magnesium chloride or germanium chloride can be further added.

The methathesis catalyst is used in an amount of about 0.01 to about 50 millimoles, preferably 0.1 to 10 millimoles, per mole of the norbornene monomer. The activator (co-catalyst) is used at a molar ratio of from 0.1 to 200, preferably from 2 to 10, to the catalyst component.

Preferably both the methathesis catalyst and the activator are used in the state dissolved in the monomer, but the catalyst and activator can be used while suspended or dissolved in a small amount of a solvent, as long as properties of the product are not substantially degraded.

(Polymerization conditions)

In the present invention, the norbornene monomer is introduced into a mold having a predetermined shape and bulk polymerization is carried out in the mold in the presence of the methathesis catalyst, and according to this polymerization process, a shaped article having a thick section is prepared. A substantial bulk polymerization is sufficient, and the presence of a small amount of an inert solvent is permissible.

According to a preferred embodiment of the process for the preparation of a thick shaped article, the norbornene monomer is divided into two liquid portions which are charged into two separate vessels, the methathesis catalyst is added to one liquid while the activator is added to the other liquid, to prepare two stable reaction solutions, the two reaction solutions are mixed together, the mixture is cast in a mold having a predetermined shape, and ring-opening bulk polymerization is started, whereby a thick shaped article is obtained.

The casting method is not particularly critical, but if the pot life at room temperature is relatively long, a method may be adopted in which, after completion of the mixing of the two reaction solutions in a mixer, injection or casting into the mold is conducted one to several times, or many more times according to need (see, for example, Japanese Unexamined Patent Publication No. 59-51,911). Furthermore, the mixture can be continuously supplied. In this case, an apparatus having a size smaller than that of the impinging mixing apparatus can be adopted, and this method is also advantageous in that the operation can be performed under a lower pressure. The casting pressure is not particularly critical and a pressure lower than 20 kg/cm² is generally sufficient. Preferably, the operation is carried out under atmospheric pressure.

The process of the present invention is not limited to the embodiment wherein the two reaction liquids are used. As can be easily understood by persons with ordinary skill in the art, various modifications can be adopted, for example, a modification in which the reaction liquid and an additive are charged in a third vessel and the mixture is used as a third stream.

The polymerization time is appropriately decided in accordance with the exotherm temperature. If the polymerization time is too short, it is difficult to control the maximum curing exotherm temperature to a level not exceeding 160° C.

Preferably, the components to be used for the polymerization reaction are stored in an atmosphere of an inert gas such as nitrogen gas, and the operation is carried out in this inert gas atmosphere. The mold may or may not be sealed with an inert gas.

(Mold and removal of reaction heat)

In the present invention, since the RIM method is adopted, an expensive mold ordinarily used for thermoplastic resins need not be used. Where ordinary thick shaped article are produced, a mold made of a metal such as steel or aluminum or a resin such as an epoxy resin, an unsaturated polyester resin or polyfluorinated ethylene can be adopted in a conventional manner.

Where thick shaped articles for use as a machinable stock are produced, any material capable of resisting the curing exotherm temperature may be used as the material of the mold. For example, molds formed of steel, aluminum, polytetrafluoroethylene, wood or the like can be used. Since the method is adopted, different from the injection molding method for thermoplastic resins, in which the reaction solution having a low viscosity is cast in the mold, and reacted and cured in the mold, and since the product is machinable stock to be later machined, a high precision is not necessary for the mold. Since the machinable stock (so-called processing block) generally has a shape of a round rod, a square rod, a thick board, a pipe or the like, the mold is formed to have a corresponding shape. The reaction solution may be cast from the upper or lower portion of the mold.

(1) Method of controlling the maximum curing exotherm temperature to a level not exceeding 160° C.

Various methods can be adopted for removing the reaction heat from the mold, but a method in which the outer side of the mold is air-cooled or water-cooled is most advantageous. Various cooling media and anti-freeze liquids can be used as well as water. To increase the cooling efficiency, a special contrivance may be added to the structure of the mold, and a pleat or a cooling water path may be provided on the outer side of the mold. Furthermore, the mold may be formed of a material having a good heat conductivity, such as aluminum or copper. A method for feeding air by a fan is simple as the air-cooling method, and as the water-cooling method, there can be also mentioned a method in which the mold is merely dipped in a water tank.

The temperature of the mold is selected so that the maximum curing exotherm temperature of the reaction mixture does not exceed 160° C. The appropriate mold temperature is not higher than 60° C., preferably not higher than 50° C., although this temperature varies to some extent depending upon the cooling method, the pot life of the reaction solution, and other reaction conditions. At any rate, preferably tests are carried out in advance to determine suitable conditions according to the shape of the mold to be used.

(2) Method of controlling the temperature difference in the interior of the polymerization product below 80° C.

After the monomer charge is cast into the mold, polymerization commences due to the chemical reactivity thereof. Usually, polymerization commences in the interior portion of the monomer charge. Although it is possible to heat the outer side of the mold to initiate the reaction, pores are liable to occur in the polymerization product. The thicker the polymerization product, the more difficult the control of the maximum curing exotherm temperature and the more conspicuous the occurrence of pores.

The charge in the mold reaches the maximum cure exotherm temperature. After the polymerization is completed, the polymerization product is taken from the mold while the mold is cooled. The maximum curing exotherm temperature varies depending upon the particular composition of the monomer charge, but is usually from 200 to 230° C. and occasionally reaches 235° C. or higher.

In the second aspect of the present invention, it is important to control the temperature difference in the interior of the polymerization product below 80° C., preferably below 70° C. and more preferably below 50°

C during the course of cooling from the maximum curing exotherm temperature to the glass transition temperature. The temperature difference is maximum usually between the center of the polymerization product and the surface thereof in contact with the mold, and therefore, the polymerization product is cooled uniformly while this temperature difference is controlled below 80° C.

The method of cooling the polymerization product is not particularly limited. For example, a method can be adopted wherein, at the time the charge reaches the maximum curing exotherm temperature, the outer side of the mold is heated by steam or an electrical heater so that the predetermined temperature difference is maintained. To enhance the cooling speed and raise the productivity, the heating temperature is selected so that the temperature difference is as large as possible within the permissible range.

When the temperature of the polymerization product is decreased with a decrease of the mold temperature and reaches below the glass transition temperature, even though the polymerization product is rapidly cooled, pores are not formed in the product.

As the method of cooling the polymerization product, various methods can be adopted. For example, where steam is used for the above-mentioned temperature control, a method of reducing the steam pressure or introducing water instead of steam can be adopted. Where a heater is used for the above-mentioned temperature control, a method of reducing the electrical current can be adopted. A cooling apparatus may be provided for each mold or a common cooling apparatus may be provided for an assembly of a plurality of molds.

It is preferred that a temperature sensor is provided in the polymerization product and the mold temperature is controlled to obtain the desired temperature difference. However, once the composition of the monomer charge and the pot life are set, the reaction temperature and the cooling speed can be varied with a lapse of time in approximately the same pattern. Therefore, if a pre-test is conducted to determine the appropriate cooling speed, it is not necessary to provide a temperature sensor in each mold.

(Optional components)

The characteristics of the thick shaped article of the present invention can be modified by an incorporation of various additives such as a filler, a pigment, a colorant, an antioxidant, an elastomer, a dicyclopentadiene type heat-polymerized resin, a fire retardant and a lubricant.

By the incorporation of an antioxidant into the reaction mixture, it is possible to raise the ignition point of the polymer above 120° C., but still combustion does not occur at the machining step and cutting chips do not catch fire, and moreover, discoloration or deformation does not occur at the machining step. Accordingly, in this case, a thick shaped article having an especially good machinability is obtained.

As the antioxidant that can be used in the present invention, there can be mentioned a phenolic antioxidant, a phosphorus antioxidant, an amine antioxidant and other various antioxidants for plastics and rubbers. These antioxidants can be used singly or in the form of a mixture of two or more thereof. The antioxidant is incorporated in an amount such that the ignition point of the norbornene polymer is at least 120° C., preferably at least 130° C. Namely, the antioxidant is incorporated in an amount of at least 0.5% by weight, preferably 1 to 3% by weight, based on the norbornene polymer. If the amount of the antioxidant is too small, it is impossible to raise the ignition point of the shaped article to a significant degree. The upper limit of the amount of the antioxidant incorporated is not critical, but too large an amount of the antioxidant incorporated is not preferred from the economical viewpoint and sometimes results in inhibition of the polymerization. Especially, it has been found that, if an amine antioxidant is used in an amount larger than 2% by weight, the polymerization reaction is inhibited. Therefore, preferably, an amine antioxidant is used in an amount of 0.5 to 2% by weight.

As the phenolic antioxidant, there can be mentioned, for example, 4,4-dioxydiphenyl, hydroquinone monobenzyl ether, 2,4-dimethyl-6-t-butylphenol, 2,6-di-t-butylphenol, 2,6-diamylhydroquinone, 2,6-di-t-butyl-p-cresol, 4-hydroxymethyl-2,6-di-t-butylphenol, 4,4,-methylene-bis-(6-t-butyl-o-cresol), butylated hydroxyanisole, phenol condensate, butylenated phenol, dialkylphenol sulfide, high-molecular-weight polyhydric phenol and bisphenol.

As the phosphorus antioxidant, there can be mentioned, for example, aryl and alkylaryl phosphites such as tri(phenyl) phosphite and tri(nonylphenyl) phosphite.

As the amine antioxidant, there can be mentioned, for example, phenyl-α-naphthylamine, 4,4'-dioctyldiphenylamine, N,N'-di-β-naphthyl-p-phenylenediamine, N,N'-diphenyl-p-phenylenediamine, N-phenyl-N'-cyclohexyl-p-phenylenediamine, N,N'-di-o-tolylethylenediamine and alkylated diphenylamine.

Various commercially available products can be used as well as the above-mentioned antioxidants. Furthermore, the antioxidant used may be copolymerizable with the monomers used. The copolymerizable antioxidant includes, for example, a norbornenyl phenol compound such as 5-(3,5-di-t-butyl-4-hydroxybenzyl)-2-norbornene (see Japanese Unexamined Patent Publication No. 57-83,522).

As the filler, there can be used inorganic fillers such as glass, carbon black, talc, calcium carbonate and mica.

As the elastomer, there can be mentioned natural rubbers, polybutadiene, polyisoprene, a styrene/butadiene copolymer (SBR), a styrene/butadiene/styrene block copolymer (SBS), a styrene/isoprene/styrene block copolymer (SIS), an ethylene/propylene/diene terpolymer (EPDM), an ethylene/vinyl acetate copolymer (EVA) and hydrogenation products thereof.

These additives are added to one or both of the reaction solutions in advance.

(Properties and uses of thick shaped articles)

A shaped article having a thick section, which is of a high quality and substantially free of pores, can be prepared in a high efficiency by the process of the present invention. The pores referred to herein can be recognized with the naked eye when the cut section is inspected, and have a diameter of at least about 0.1 mm. The pores can also be recognized by applying ultrasonic wave of 0.5 to 10 MHz and inspect the disturbance of reflected wave. A commercially available ultrasonic flow detector can be used for this purpose. By the expression "substantially free of pores" is meant that, when the stock is cut at intervals of 100 mm, no pores can be seen in any of the cut sections.

The thick shaped article can take any of various shapes, such as a round rod, a square rod, a sheet, and a pipe. The diameter or thickness is at least 20 mm, preferably at least 50 mm. Since the reactive injection molding method is adopted, a large shaped article can be easily produced, and for example, in the case of a round rod, a product having a diameter of about 300 mm or a larger can be prepared. A thick shaped article having a weight of 20 kg or more can be produced.

Where the thick shaped article is a machinable stock, the article should possess a glass transition temperature of at least 80° C., preferably at least 100° C., especially preferably at least 130° C. Preferably the ignition loss of the machinable stock is less than 5% by weight, especially less than 3% by weight, as determined by the thermobalance method wherein heating is effected at a temperature-elevating rate of 20° C. per minute in a nitrogen atmosphere and the weight loss is measured at 400° C. The ignition loss indicates the total amount of the unreacted monomer and the decomposition product of the polymer, and therefore, the smaller the value of the ignition loss, the better the machinable stock.

If the antioxidant is incorporated in an amount of at least 0.5% by weight, preferably 1 to 3% by weight, based on the weight of the monomer, it is possible to raise the ignition point to at least 120° C., as determined by the high-pressure differential thermal analysis method, wherein 10 mg of the sample frozen, pulverized and passed through a 100-mesh sieve is used. The measurement is carried out in high-pressure oxygen by using a high-pressure differential thermo-balance as the measurement apparatus and the point of an abrupt rise in the differential heat curve is defined as the ignition point. Therefore, the stock is not ignited under ordinary machining conditions. Moreover, the machinable stock of the present invention shows a good processability at the machining step and has a small water-absorbing property, with the result that the dimensional stability is improved. Furthermore, the weight of the machinable stock is light.

A shaped article having a predetermined shape can be obtained by machining this machinable stock according to the same procedures as adopted for metal blocks. The means used for the machining operation are not particularly critical. For example, there can be mentioned lathing, screw cutting, milling, drilling, and reaming. At the machining step, heat is generated in the stock by friction, and since an excessive heat generation causes deformation or discoloration, preferably the temperature is kept below 200° C.

The machinable stock can be machined into various articles, for example, pillows, gears, racks, cams, shafts, levers, bearings, pulleys, driving gears, rollers, flanges, wheels, wearing parts, liners, buckets, washers, sliding plates, insulators and other various parts. These machined products can be widely used in various fields for iron and metal working machinery, civil engineering and construction machinery, textile machinery, transportation and delivery machinery, food processing machinery and other known machines. The machinable stock can also be machined into a casing of a plastic pump, a motor base of a pump, a thick-walled box, a thick-walled pipe having a large diameter, and a tank.

The present invention will now be described in detail with reference to the following examples and comparative examples. The scope of the invention is not limited by these examples. Note, in the examples, all of "parts" and "%" are by weight unless otherwise indicated.

EXAMPLE 1

Dicyclopentadiene (hereinafter referred to as "DCP") containing 2% of a phenolic antioxidant (Irganox 259 supplied by Ciba-Geigy) was charged in two vessels. To one vessel, diethylaluminum chloride (DEAC), n-propanol and silicon tetrachloride were added at concentrations of 33 mM, 42.9 mM and 20 mM, respectively, based on DCP. To the other vessel, tri(tridecyl)ammonium molybdate was added at a concentration of 4 mM based on DCP.

Both the reaction liquids maintained at 25° C. were mixed together at a mixing ratio of 1/1 by using a gear pump and a power mixer. The mixture exhibited a pot life of about 10 minutes at 25° C. The mixture was cast under a substantially atmospheric pressure into a steel mold having a shape shown in Table 1 and an upper side opened, from the upper portion of the mold. The conditions for removing the heat from the mold are shown in Table 1. These operations were carried out in a nitrogen atmosphere.

The so-obtained block having a shape of a round rod (machinable block) was cut at intervals of 100 mm in the longitudinal direction, and the cut sections were observed with the naked eye.

In each of the obtained blocks, the glass transition temperature (Tg) was 145 to 150° C. and the ignition loss by the thermobalance method was in the range of 2 to 3%, and it was confirmed that the reaction was sufficiently advanced.

When the ignition point was measured under an oxygen pressure of 10 kg/cm$^2$ by the differential thermal analysis, it was found that, in each of the blocks, the ignition point was higher than 120° C.

TABLE 1

| Run No. | Present Invention | | | Comparison | | |
|---|---|---|---|---|---|---|
| | 1 | 2 | 3 | 4 | 5 | 6 |
| Shaped of mold | | | | | | |
| Inner diameter (mm) | 50 | 75 | 100 | 75 | 75 | 75 |
| Height (mm) | 800 | 800 | 800 | 800 | 800 | 800 |
| Heat-removing method | Air cooling in open air | Water cooling in water tank | Water cooling in water tank | Air cooling in open air | Water cooling in water tank | Warm water in water tank |
| Mold temperature (°C.) | 25 | 18 | 18 | 25 | 30 | 60 |
| Time required for start of exothermic reaction (minutes) | 10 | 20 | 20 | 10 | 8 | 3 |
| Maximum curing exotherm temperature (°C.) | 150 | 135 | 145 | 175 | 165 | 200< |
| Presence or absence of pores*[1] | A | A | A | C | B | C |

Note
*[1] The presence or absence of pores having a diameter of at least 0.1 mm on the section cut at an interval of 100 mm. The case where no pores were observed is indicated by A, the case where 1 to 9 pores were observed is indicated by B, and the case where at least 10 pores were observed is indicated by C.

As apparent from the results shown in Table 1, where the bulk polymerization is carried out while controlling the maximum curing exotherm temperature to a level not exceeding 160° C. according to the present invention (Runs 1 through 3), no pores can be found in the cut sections of the block, whereas in the comparative case where the maximum curing exotherm temperature is high and exceeds 160° C. (Runs 4 and 5), many pores are formed. In the conventional RIM method using a norbornene monomer, the reaction liquid is cast in a mold after the mold has been heated. If this method is adopted in the present invention, the maximum curing exotherm temperature exceeds 200° C., smoking occurs at the reaction and a satisfactory stock can not be obtained (Run 6).

EXAMPLE 2

To check the presence or absence of pores relative to the pot life of the reaction solution and the size (diameter) of a round rod-shaped block, various round rod-shaped blocks differing in diameter were prepared in the same manner as described in Example 1, except that the amount of n-propanol added was changed so that the concentration of n-propanol was 49.3 mM based on DCP. The pot life of the reaction solution was at least 1 hour at 25° C. The shape of the mold and the conditions for removing the heat from the mold were as shown in Table 2.

In each of the so-obtained blocks, the Tg was 145 to 150° C., the ignition loss was 2 to 3% as determined by the thermobalance method, and the ignition point as determined by differential thermal analysis was higher than 120° C.

From the results shown in Table 2, it can be understood that, if the pot life is prolonged, the time required for the start of the exothermic reaction is prolonged and the productivity is thus relatively reduced, but a block having a larger diameter can be obtained without formation of pores.

EXAMPLE 3

DCP containing 2% of a phenolic antioxidant (Irganox 259 supplied by Ciba-Geigy) was charged in two vessels. To one vessel, diethylaluminum chloride (DEAC), n-propanol and silicon tetrachloride were added at concentrations of 33 mM, 42.9 mM and 20 mM, respectively, based on DCP. To the other vessel, tri(tridecyl)ammonium molybdate was added at a concentration of 4 mM based on DCP.

Both the reaction liquids maintained at 25° C. were mixed together at a mixing ratio of 1/1 by using a gear pump and a power mixer. The mixture exhibited a pot life of about 10 minutes at 25° C. The mixture was cast under a substantially atmospheric pressure into a steel mold having a shape shown in Table 3. The mold was provided with a jacket through which steam or cooling water can be passed.

When the liquid mixture was cast into the mold, the mold was maintained at room temperature, and, when the reaction mixture reached the maximum curing exotherm temperature, the polymerization product was cooled under the heat removal conditions shown in Table 3. These operations were carried out in a nitrogen atmosphere.

The so-obtained block having a shape of a round rod (machinable block) was cut at intervals of 100 mm in the longitudinal direction, and the cut sections were observed with the naked eye. The results are shown in Table 3.

In each of the obtained blocks, the glass transition temperature (Tg) was 145 to 150° C. and the ignition loss by the thermobalance method was in the range of 2 to 3%, and it was confirmed that the reaction was sufficiently advanced.

When the ignition point was measured under an oxygen pressure of 10 kg/cm$^2$ by the differential thermal analysis, it was found that, in each of the blocks, the ignition point was higher than 120° C.

TABLE 2

| Run No. | Present Invention | | |
|---|---|---|---|
| | 6 | 7 | 8 |
| Shape of mold | | | |
| Inner diameter (mm) | 75 | 150 | 200 |
| Height (mm) | 800 | 800 | 800 |
| Heat-removing method | Air cooling | Water cooling | Water cooling |
| Mold temperature (°C.) | 25 | 40 | 40 |
| Time required for start of exothermic reaction (minutes) | 300 | 195 | 60 |
| Maximum curing exothermic temperature (°C.) | 130 | 146 | 149 |
| Presence or absence of pores* | A | A | A |

*Determined by the same procedure as described in the footnote of Table 1.

TABLE 3

| Run No. | Present Invention | | | | Comparison | | |
|---|---|---|---|---|---|---|---|
| | 10 | 11 | 12 | 13 | 14 | 15 | 16 |
| Shape of mold | | | | | | | |
| Inner diameter (mm) | 80 | 100 | 100 | 100 | 80 | 80 | 100 |
| Height (mm) | 800 | 800 | 800 | 800 | 800 | 800 | 800 |
| Time required for start of exothermic reaction (minutes) | 20 | 25 | 25 | 25 | 20 | 20 | 25 |
| Maximum curing exotherm temperature (°C.) | 214 | 228 | 223 | 225 | 212 | 224 | 223 |
| Heat removal conditions:*[1] | | | | | | | |
| Temperature difference (°C.) | 50–55 | 50–55 | 45–50 | 33–38 | 120–150 | 80–90 | 80–90 |
| Cooling time (minutes) | 110 | 160 | 180 | 290 | 15 | 30 | 50 |
| Presence or absence of pores*[2] | A | A | A | A | C | C | C |

Note
*[1]The temperature difference denotes the difference between the temperature of the center of the reaction mixture exhibiting the maximum curing exotherm temperature and the mold temperature. The cooling time denotes the period of time for which the polymerization product was cooled from the maximum curing exotherm temperature to the glass transition temperature while the specified temperature difference was maintained.
*[2]Determined by the same procedure as described in the footnote of Table 1.

As apparent from the results shown in Table 1, where the bulk polymerization product is cooled while controlling the temperature difference between the center thereof and the mold below 80° C. according to the present invention, no pores can be found in the cut sections of the resulting block. Whereas, in the comparative case where the polymerization product was rapidly cooled with the specified temperature difference exceeding 80° C., many pores are formed.

EXAMPLE 4

A round rod-shaped block was prepared in the same manner as described in Example 3 except that a monomer mixture composed of 55% of DCP and 45% of a cyclopentadiene trimer (a mixture of about 80% of an unsymmetrical type monomer and about 20% of a symmetrical type monomer) was used instead of DCP as the monomer. The mold used was made of steel, had an inner diameter of 100 mm and a height of 800 mm, and was provided with a jacket for circulation of cooling water or steam.

The so-obtained block was cut at intervals of 100 mm in the longitudinal direction, and the cut sections were observed with the naked eye. The results are shown in Table 4.

In each of the obtained blocks, the glass transition temperature (Tg) was 175 to 180° C. and the ignition loss by the thermobalance method was in the range of 2 to 3%, and it was confirmed that the reaction was sufficiently advanced.

When the ignition point was measured under an oxygen pressure of 10 kg/cm$^2$ by the differential thermal analysis, it was found that, in each of the blocks, the ignition point was higher than 120° C.

TABLE 4

|  | Present Invention | |
| --- | --- | --- |
| Run No. | 27 | 28 |
| Time required for start of exothermic reaction (minutes) | 23 | 21 |
| Maximum curing exotherm temperature (°C.) | 211 | 209 |
| Heat removal conditions:*[1] | | |
| Temperature difference (°C.) | 40–45 | 50–55 |
| Cooling time (minutes) | 180 | 170 |
| Presence or absence of pores*[2] | A | A |

*[1] and *[2]: the same as the footnote of Table 3.

From the results shown in Table 4, where the bulk polymerization product is cooled while controlling the temperature difference between the center thereof and the mold below 80° C. according to the present invention, no pores can be found in the cut sections of the resulting block, whereas in the comparative case where the polymerization product was rapidly cooled, many pores are formed.

EXAMPLE 5

Two reaction liquids were prepared in the same manner as described in Example 1 except that a monomer mixture composed of 55% of DCP and 45% of a cyclopentadiene trimer (a mixture of about 80% of an unsymmetrical type monomer and about 20% of a symmetrical type monomer) was used instead of DCP as the monomer.

Both the reaction liquids maintained at 25° C. were mixed together at a mixing ratio of 1/1 by using a gear pump and a power mixer. The mixture was cast under a substantially atmospheric pressure into a steel mold having a mold cavity of 75 mm × 600 mm × 600 mm size. The steel mold was provided with a jacket through which cooling water was circulated to maintain the mold temperature at 40° C. The time required for start of exothermic reaction was 200 minutes, and the maximum curing exotherm temperature was 142° C.

When the resulting thick plate was cut at an interval of 100 mm and the cut sections were observed by the naked eye, no pore was found.

In the present invention, a thick shaped article without pores, having a small water-absorbing property and a light weight can be provided according to the RIM method using a polycyclic norborne monomer. Since the RIM method is adopted, the present invention is economically advantageous in that a thick shaped article having a large size can be prepared by using a cheap mold.

We claim:

1. A process for the preparation of a substantially pore-free shaped article having a thick section, composed of polycyclic norbornene polymer, which comprises bulk-polymerizing a monomer charge selected from norbornene monomers having tricycle and higher cyclic structures with a metathesis catalyst in a mold, and cooling the polymerization product while controlling the temperature difference between the interior of the polymerization product and the exterior of the polymerization product below 80° C. during the cooling period spanning from the maximum exotherm temperature to the glass transition temperature of the polymerization product.

2. The process according to claim 1, wherein the shaped article has a diameter thickness of at least 20 mm.

3. The process according to claim 1, wherein the shaped article has a glass transition temperature of at least 80° C. and an ignition loss of less than 5% by weight as determined at a temperature of 400° C. in a nitrogen atmosphere and at a temperature-elevating rate of 20° C. per minute.

4. The process according to claim 1, wherein the bulk polymerization of the norbornene monomer is carried out further with of at least 5% by weight, based on the weight of the monomer, of an antioxidant, and the resulting polycyclic norbornene polymer has an ignition point of at least 120° C.

5. The process according to claim 4, wherein said monomer charge contains at least 10% by weight, based on the weight of said monomer charge of a crosslinking monomer which is bulk-polymerized to obtain a thermoset polycyclic norbornene polymer.

6. The process according to claim 5, wherein the shaped article having a thick section is a machinable stock.

7. The process of claim 1 wherein the shaped article has a thickness of at least 50 mm.

8. A process for the preparation of a substantially pore-free shaped article having a thick section, composed of polycyclic norbornene polymer which comprises bulk-polymerizing a monomer charge selected from norbornene monomers having a tricyclic and higher cyclic structures with a metathesis catalyst, in the presence of at least 5% by weight of an antioxidant and at least 30% by weight of a crosslinking monomer, based on the weight of said monomer charge, in a mold while controlling maximum curing exotherm temperature to a level of 160° C. and below whereby the thermoset polycyclic norbornene polymer has ignition point of at least 120° C.

9. The process according to claim 8, wherein the shaped article having a thick section is a machinable stock.

* * * * *